United States Patent [19] [11] 4,380,567
Shigemoto [45] Apr. 19, 1983

[54] ETHYLENIC COMPOSITE FILM STRUCTURE

[75] Inventor: Hiromi Shigemoto, Iwakuni, Japan

[73] Assignee: Mitsui Petrochemical Industries, Ltd., Tokyo, Japan

[21] Appl. No.: 307,206

[22] Filed: Sep. 30, 1981

[30] Foreign Application Priority Data

Oct. 9, 1980 [JP] Japan .............................. 55/140488

[51] Int. Cl.$^3$ ............................................. B32B 27/00
[52] U.S. Cl. .................................... 428/213; 428/347; 428/354; 428/516; 428/349; 428/215
[58] Field of Search ............... 428/354, 349, 347, 516, 428/212, 213, 215

[56] References Cited

U.S. PATENT DOCUMENTS 4,151,318 4/1979 Marshall .............................. 428/516
4,205,021 5/1980 Morita .................................. 525/240
4,252,851 2/1981 Lansbury ............................. 428/347
4,303,710 12/1981 Ballard ................................ 428/516

Primary Examiner—Marion McCamish
Assistant Examiner—E. Rollins Buffalow
Attorney, Agent, or Firm—Sherman & Shalloway

[57] ABSTRACT

A composite film structure composed of a layer (A) of high density polyethylene having an intrinsic viscosity $[\eta]$ as measured in decalin at 135° C. of 1.3–2.9 dl/g, a melt index ($MI_A$) of 0.3–7.0 g/10 min. and a density of 0.950–0.970 g/cm$^3$, in which up to 2 mole % of an alpha-olefin may be contained; and layers (B) of an ethylene/$C_5$–$C_{10}$ alpha-olefin random copolymer having an intrinsic viscosity $[\eta]$ as measured in decalin at 135° C. of 1.0–2.4 dl/g, a melt index ($MI_B$) of 0.5–20 g/10 min., a density of 0.910–0.940 g/cm$^3$, and a melting point of 115°–130° C., with the proviso that the $MI_A$/$MI_B$ ratio is 0.15–4.0, said layers (B) being in direct contact with the two sides of said layer (A) and laminated thereto.

7 Claims, No Drawings

ETHYLENIC COMPOSITE FILM STRUCTURE

This invention relates to an ethylenic composite film structure and, in particular, to an ethylenic composite film structure of sandwich structure conjointly excelling in not only heat sealability at low temperatures and heat seal strength but also hot tackiness, rigidity and transparency.

More specifically, this invention relates to a composite film structure composed of a layer (A) of high density polyethylene having an intrinsic viscosity $[\eta]$ as measured in decalin at 135° C. of 1.3–2.9 dl/g, a melt index ($MI_A$) of 0.3–7.0 g/10 min., and a density of 0.950–0.970 g/cm$^3$, in which up to 2 mole % of an alpha-olefin may be contained; and layers (B) of an ethylene/C$_5$–C$_{10}$ alpha-olefin random copolymer having an intrinsic viscosity $[\eta]$ as measured in decalin at 135° C. of 1.0–2.4 dl/g, a melt index ($MI_B$) of 0.5–20 g/10 min., a density of 0.910–0.940 g/cm$^3$, and a melting point of 115°–130° C., with the proviso that the $MI_A/MI_B$ ratio is 0.15–4.0, said layers (B) being in direct contact with the two sides of said layer (A) and laminated thereto.

As films excelling in transparency and rigidity, known are say Cellophane and polypropylene film. These films however are not quite satisfactory in their low-temperature heat sealability and resistance to cold. Hence, there is imposed a limitation on the use of these films alone. They are thus unsuitable for use in the packaging of frozen foods and confections and foodstuffs containing a large quantity of water where there is required that the film possesses resistance to cold.

On the other hand, as films possessing satisfactory resistance to cold, there is known say the polyethylene film. However, in the case of the high pressure process low density polyethylene film whose transparency was relatively good, there was the shortcoming that its rigidity was low and its mechanical strength was poor. On the other hand, in the case of the high density polyethylene whose rigidity was high and mechanical strength was satisfactory, there was the drawback that its transparency and low-temperature heat sealability were poor.

There are also known composite film structures composed of a high density polyethylene film of high molecular weight and a low density polyethylene or ethylene/vinyl acetate copolymer film laminated thereto. These film structures exhibit improvement in such properties as transparency, tear strength and the reduction in the number of fish eyes.

There has however not yet been provided an ethylenic composite film structure which excels to a satisfactory degree in not only its low-heat sealability and heat seal strength but also in its hot tackiness, rigidity and transparency.

Our researches were carried out with the view of providing an improved ethylenic composite film structure which, without impairment of the desirable rigidity and mechanical strength of the high density polyethylene film, would be endowed conjointly with such properties as superior transparency, low-heat sealability, heat seal strength and hot tackiness.

These researches led to the discovery that a composite film structure conjointly excelling to a satisfactory degree in such properties as low-heat sealability, heat seal strength, hot tackiness, rigidity and transparency can be provided by an ethylenic composite film structure composed of a layer (A) of high density polyethylene satisfying specific intrinsic viscosity $[\eta]$, melt index ($MI_A$) and density conditions and, in direct contact with the two side surfaces of the layer (A) and laminated thereto, layers (B) of an ethylene/C$_5$–C$_{10}$ alpha-olefin random copolymer satisfying specific intrinsic viscosity $[\eta]$, melt index ($MI_B$), density and melting point conditions, in which the $MI_A/MI_B$ ratio is 0.15–4.0.

It was further found that despite the fact that the thickness of the composite film structure is much greater than that of the layer (A) alone, the former demonstrates a much higher transparency than the latter. Again, it was found that the foregoing composite film structure shows a strikingly improved heat sealability at low temperature and heat seal strength as compared with a composite film structure made up by laminating there layers of the foregoing layer (B).

Further, the composite film structure of this invention was found to be much more superior in transparency and gloss to a composite film structure having the layer (B) laminated to only one side of the layer (A), as shown experimentally in a hereinafter-given comparative example.

It is therefore an object of this invention to provide an ethylenic composite film structure having improved properties.

The above and other objects and advantages of this invention will become apparent from the following description.

The high density polyethylene constituting the layer (A) in this invention is one having an intrinsic viscosity $[\eta]$ as measured in decalin at 135° C. of 1.3–2.9 dl/g, preferably 1.6–2.4 dl/g, a melt index ($MI_A$) [ASTM Method D 1238E] of 0.3–7.0 g/10 min., preferably 0.5–3.0 g/10 min., and a density of 0.950–0.970 g/cm$^3$, preferably 0.950–0.965 g/cm$^3$. This high density polyethylene may be a copolymer containing a small amount of up to about 2 mole % of an alpha-olefin, for example, a C$_3$–C$_8$ alpha-olefin, as a comonomer. As such an alpha-olefin, there can be mentioned such olefins as propylene, 1-butene, 1-pentene, 1-hexene and 4-methyl-1-pentene.

When the intrinsic viscosity $[\eta]$ is so small as to be less than 1.3 dl/g, the mechanical strength of the layer (A) suffers, whereas when the intrinsic viscosity exceeds 2.9 dl/g, difficulty is experienced in molding the layer (A). When the melt index ($MI_A$) is less than 0.3 g/10 min., the melt viscosity becomes too high, with the consequence that it becomes difficult to mold the layer, whereas when the melt index ($MI_A$) exceeds 7 g/10 min., this also is undesirable, since the mechanical strength of the layer (A) suffers. On the other hand, when the density is less than 0.950 g/cm$^3$, the rigidity of the layer (A) is low. And when it is laminated with the layers (B), the low-temperature heat seal strength is inadequate.

The ethylene/C$_5$–C$_{10}$ alpha-olefin random copolymer that constitutes the layers (B), which are laminated in direct contact with the two sides of the layer (A) of high density polyethylene, is a polymer having an intrinsic viscosity $[\eta]$ as measured in decalin at 135° C. of 1.0–2.4 dl/g, preferably 1.2–2 dl/g, a melt index ($MI_B$) of 0.5–20 g/10 min., preferably 1.0–10 g/10 min., a density of 0.910–0.940 g/cm$^3$, preferably 0.915–0.935 g/cm$^3$, and a melting point of 115°–130° C., preferably 115°–125° C.

When the intrinsic viscosity $[\eta]$ of the ethylene random copolymer is less than 1.0 dl/g, the heat seal strength becomes inadequate, whereas when it exceeds 2.4 dl/g, difficulty is experienced in carrying out the molding of the layers (B). When the melt index ($MI_B$) is less than 0.5 g/10 min., molding of the layers also becomes difficult as a result of the melt viscosity becoming too high. On the other hand, when the melt index ($MI_B$) exceeds 20 g/10 min., the moldability also suffers as a result of the melt viscosity becoming too low. In addition, the heat seal strength is also low. On the other hand, when the density if less than 0.910 g/cm$^3$, not only does the surface of the layer (B) become tacky, but also its oil resistance suffers. When the density exceeds 0.940 g/cm$^3$, both the transparency and hot tackiness suffer.

The melting point of the ethylene random copolymer used in this invention is the maximum temperature indicated by sharp endothermic peaks of an endothermic curve obtained by differential thermal analysis (DSC) at a rate of temperature rise of 10° C. per minute. There are present one or more and in most instances two or three sharp endothermic peaks in the case of the ethylene random copolymer used in this invention. And the maximum temperature of these sharp endothermic peaks, i.e., the melting point of the copolymer, is 115°–130° C., preferably 115°–125° C. When the copolymer has a melting point less than 115° C., its heat resistance is poor and the resistance to solvent decreases. On the other hand, a melting point exceeding 130° C. is also not desirable, since the low-temperature heat sealability suffers.

As the $C_5$–$C_{10}$ alpha-olefin of the ethylene random copolymer, included are, for example, 1-pentene, 1-hexene, 4-methyl-1-pentene, 1-octene and 1-decene, or the mixture of these olefins. Especially preferred are the alpha-olefins of 6 to 8 carbon atoms, particularly 4-methyl-1-pentene.

The process for producing the ethylene random copolymer used in this invention is known per se, and any of the processes that can form a copolymer satisfying the aforementioned conditions can be employed. As convenient processes, mention can be made of the processes disclosed in, for example, Japanese Laid-Open Patent Publication No. 92887/78 (corresponding to U.S. Pat. No. 4,205,021) and Japanese Laid-Open Patent Publication No. 21486/79.

The amount of ethylene contained in the ethylene random copolymer may be suitably chosen. It may be from about 90 mole % to about 99.5 mole %, and preferably from about 95 mole % to about 99 mole %.

In this invention the ratio of the melt index ($MI_A$) of the high density polyethylene constituting the layer (A) to the melt index ($MI_B$) of the ethylene random copolymer constituting the layers (B) is 0.15–4.0, preferably 0.4–2.0. When the foregoing ratio is without the range of 0.15–4.0, there occurs an irregular and random interpenetration at the interface where contact between the layers (A) and (B) takes place to cause an interface unstabilizing phenomenon to appear with adverse effects on the transparency of the product. Hence, the $MI_A/MI_B$ ratio must be chosen to come within the foregoing range.

In the three-layered composite film structure of this invention the thicknesses of the several layers (A) and (B), (B) can be suitably chosen.

The thicknesses of the two layers (B), (B), the covering layers, which need not necessarily be the same, are say about 1–20 microns. When the film is especially required to have a low-temperature heat sealability, the thickness of the layers (B) should preferably be say 1–10 microns, and particularly about 1–5 microns. Even when the thickness of the layers (B) exceeds 20 microns, the resulting composite film structure demonstrates a better low-temperature heat sealability than that of an ethylene random copolymer layer (B) of the same thickness, but the effects are smaller than the case where the thickness is less than 20 microns.

The thickness of the layer (A), the core layer, can also be suitably chosen. For example, a thickness of say 5–100 microns, and preferably 5–50 microns, will do.

For forming the layer (B)/layer (A)/layer (B) composite film structure of this invention, any suitable means that can laminate the layers (B), (B) to both sides of the layer (A) in direct contact therewith can be employed.

Usable are such methods as that of laminating the layers (B), (B) by melt-extrusion to the two sides of a layer (A) that has been formed in advance or that of forming the layer (B), layer (A) and layer (A) by melt-coextrusion using a die having a three-layer structure. In view of the fact that it is possible to form layers (B), (B) as thin layers as well as enhance the adhesiveness between the layers the employment of the coextrusion molding method is to be preferred. As the coextrusion molding method, there is the T-die method which uses a flat die or the inflation method which uses a circular die. In the case of the flat die, usable are both the single manifold setup or multimanifold setup using a black box. In the case of also the dies used in the inflation method, the known dies can be used in all cases.

In this invention, other copolymers can be blended in the aforesaid ethylene random copolymer in an amount that does not impair the improvement in properties as intended by the present invention. As such a blend, included are, for example, a blend of the foregoing ethylene random copolymer with up to about 30% by weight, based on the blend, of an ethylene/propylene random copolymer or an ethylene/1-butene random copolymer.

The layer (A) and/or layer (B) constituting the composite film structure of this invention can contain as additives of polyolefins the various known additives. Examples of such additives are the weathering stabilizers such as 2-(2'-hydroxy-3'-t-butyl-5'-methylphenyl)-5-chlorobenzotriazole, bis(2,2,6,6'-tetramethyl-4-piperidine)sebacate and 2-hydroxy-4-n-octoxybenzophenone; the thermal stabilizers such as tetrakis[methylene(3-5-di-tert-butyl-4-hydroxyhydrocinnamate]methane, tetrakis[methylene-3-(3',5'-di-t-butyl-4-hydroxyphenyl)propionate]methane and butylated hydroxytoluene; the antistatic agents such as N,N-bis(2-hydroxyethyl)alkyl($C_{12}$–$C_{16}$)amines and the EO-added monoesters of alkylamines; the anti-fogging agents such as stearyl monoglyceride and sorbitan fatty acid esters; the antiblocking agents such as silica; the slipping agents such as erucamide, oleic acid amide and the ethylene bis fatty acid amides; the lubricants such as calcium stearate, paraffin and the higher fatty acids; and the colorants such as yellow iron oxide, red iron oxide and titanium dioxide.

These additives can be used suitably in amounts that do not impair the improvements intended for the composite film structure of this invention. For example, there can be made additions, based on the weight of the resin forming the layers (A) and (B), (B), in such amounts as about 0.03 to about 0.2 weight % of the weathering stabilizer, about 0.02 to about 0.5 weight % of the thermal stabilizer, about 0.1 to about 1.0 weight % of the antistatic agent, about 0.2 to about 1.5 weight % of the antifogging agent, about 0.05 to about 0.3 weight % of the antiblocking agent, about 0.03 to about 0.2 weight % of the slipping agent, about 0.05 to about 0.2 weight % of the lubricant, and about 0.05 to about 2 weight % of the colorant.

Since the three-layered composite film structure of this invention possesses superior low-temperature heat sealability, heat seal strength, hot tackiness, rigidity, transparency and resistance to cold, it can not only be used for the packaging of the general run of foodstuffs but also suitably for the packaging of frozen foods, frozen confections and liquid products.

The following examples will serve to more fully illustrate the present invention. These examples are not to be construed as limiting the invention thereto.

EXAMPLE 1

High density polyethylene (HDPE-I) having an intrinsic viscosity [η] of 1.94 dl/g, a melt index of 1.20 g/10 min., and a density of 0.954 g/cm³ was used for the core layer (A), while an ethylene/4-methyl-1-pentene copolymer (EMC-I) having an intrinsic viscosity [η] of 1.61 dl/g, a melt index of 2.48 g/10 min., a density of 0.922 g/cm³, and a melting point of 122° C. (having also a peak at 116° C.) was used for the covering layers (B), (B). These polymers were fed to a three-layer T-die of multimanifold setup, using a 65-mm diameter extruder (cylinder temperature 250° C.) for the HDPE-I and two 40-mm diameter extruders (cylinder temperature 240° C.) for the EMC-I to give a three-layered film having covering layers (B), (B) of 3 microns in thickness in each case, a core layer (A) thickness of 24 microns and a total thickness of 30 microns. The chill roll temperature was 22° C. The film thus obtained was then tested for its properties in the following manner.

Haze (%): According to ASTM Method D 1003.
Impact strength (kg-cm/cm):
  According to ASTM Method D 3420.
Peeling strength of heat-sealed portion (g/15 mm):
  After bringing the surfaces of the films superposedly together, they are sealed for 1 second with a pressure of 2 kg/cm² by means of a 5-mm-wide seal bar at temperatures of 100°, 110°, 120°, 130°, 140° and 150° C. After allowing the adhered films to cool, they are cut into 15-mm wide test strips. The heat-sealed portion is pulled apart at a test speed of 200 mm per minute. The force required at this time is designated the peeling strength.
Hot tackiness test (mm):
  Test strips 550 mm in length and 20 mm in width are superposed, after which they are sealed for 1 second with a pressure of 2 kg/cm² by means of a seal bar 5 mm in width and 300 mm in length at temperatures of 100°, 110°, 120°, 130°, 140° and 150° C. Immediately on removal of the pressure, the sealed portion of the test strips are forcedly peeled by loading with a 43-g load. The hot tackiness is rated by the distance (mm) stripped. The shorter the stripped distance, the greater is the hot tackiness.
Flexural rigidity (kg/cm²):
  A test piece 140 mm×140 mm is prepared. With a slit width of 5 mm the test piece is subjected to a flexural stress using a Handle-O-Meter (manufactured by Thwing Albert Company. U.S.A.) to obtain the maximum stress. The value obtained by dividing the maximum stress by the thickness of the test piece is designated the flexural rigidity (kg/cm²). The flexural rigidity was calculated for the longitudinal as well as transverse direction.

The results of these tests are shown in Table 1.

EXAMPLE 2

Example 1 was repeated but using as the covering layers (B), (B) instead of EMC-I an ethylene/4-methyl-1-pentene copolymer (EMC-II) having an intrinsic viscosity [η] of 1.65 dl/g, a melt index of 2.53 g/10 min., a density of 0.935 g/cm³ and a melting point of 120.5° C. The resulting film was tested as in Example 1. The results obtained are shown in Table 1.

EXAMPLE 3

The experiment was carried out as in Example 1 but using as the core layer (A) instead of HDPE-I high density polyethylene (HDPE-II) having an intrinsic viscosity [η] of 1.82 dl/g, a melt index of 1.60 g/10 min., and a density of 0.963 g/cm³. The resulting film was tested as in Example 1. The results obtained are shown in Table 1.

COMPARATIVE EXAMPLE 1

Example 1 was repeated by using as the covering layers (B), (B) instead of EMC-I high pressure process polyethylene (HPPE-I) having an intrinsic viscosity [η] of 1.12 dl/g, a melt index of 3.3 g/10 min., a density of 0.921 g/cm³ and a melting point of 104° C. The resulting film was tested as in Example 1. The results obtained are shown in Table 1.

COMPARATIVE EXAMPLE 2

The experiment was operated as in Example 1, except that an ethylene/vinyl acetate copolymer (EVA-I) having an intrinsic viscosity [η], of 0.90 dl/g, a melt index of 1.60 g/10 min., a density of 0.930 g/cm³, and a melting point of 98° C. was used instead of EMC-I as the covering layers (B), (B). The resulting film was tested as in Example 1. The results obtained are shown in Table 1.

COMPARATIVE EXAMPLE 3

The experiment was carried out as in Example 1 but using EMC-I for both the core layer (A) and covering layers (B), (B). The resulting film was tested as in Example 1. The results obtained are shown in Table 1.

COMPARATIVE EXAMPLE 4

Comparative Example 3 was repeated but using HDPE-I instead of EMC-I. The resulting film was tested as in Example 1. The results obtained are shown in Table 1.

EXAMPLES 4, 5 AND 6

A three-layered film was prepared by operating as in Example 1 but using as the core layer (A) high density polyethylene (HDPE-III) having an intrinsic viscosity [η] of 2.1 dl/g, a melt index of 0.8 g/10 min., and a density of 0.952 g/cm³, and as the covering layers (B), (B) an ethylene/4-methyl-1-pentene copolymer (EMC-III) having an intrinsic viscosity [η] of 1.70 dl/g, a melt index of 2.10 g/10 min., a density of 0.916 g/cm³, and a melting point of 123° C. (peaks also at 119° and 101° C.).

The covering layer/core layer/covering layer thicknesses were as follows:

EXAMPLE 4

16 microns/8 microns/16 microns

EXAMPLE 5

8 microns/24 microns/8 microns

EXAMPLE 6

4 microns/32 microns/4 microns

The yield stress and breaking stress were determined in accordance with ASTM Method D882-67. The other tests were conducted as in Example 1. The results obtained are shown Table 2.

COMPARATIVE EXAMPLE 5

Example 1 was repeated but using HDPE-I for both the core layer (A) and the covering layers (B), (B) and such that the thicknesses of each of the covering layers and the core layer and the total thickness would be 3 microns, 18 microns and 24 microns, respectively. The resulting film was tested as in Example 1, with the results shown in Table 1.

COMPARATIVE EXAMPLE 6

The HDPE-I and EMC-I of Example 1 were used as the core layer (A) and covering layer (B), respectively. These polymers were fed to a three-layer T-die (width 800 mm, die temperature 240° C.), using a 65-mm diameter extruder (cylinder temperature 250° C.) for extruding the HDPE-I and a 40-mm diameter extruder (cylinder temperature 240° C.) for extruding the EMC-I to give a two-layered film having a covering layer (B) thickness of 3 microns, core layer (A) thickness of 24 microns, and total thickness of 27 microns, using a chill roll temperature of 22° C.

The properties of the film were tested as in Example 1. The results obtained are shown in Table 1.

COMPARATIVE EXAMPLE 7

A three-layered film of covering layer/core layer/covering layer thicknesses of 8/24/8 microns was obtained by operating as in Examples 4–6 but using EMC-III for all three layers. The properties of the film were tested as in Examples 4–6, with the results shown in Table 2.

TABLE 1

|  |  | Example | | | Comparative Example | | | | | |
|---|---|---|---|---|---|---|---|---|---|---|
|  |  | Example 1 | Example 2 | Example 3 | Comp. Ex. 1 | Comp. Ex. 2 | Comp. Ex. 3 | Comp. Ex. 4 | Comp. Ex. 5 | Comp. Ex. 6 |
| Covering Layer |  | EMC-I | EMC-II | EMC-I | HPPE-I | EVA-I | EMC-I | HDPE-I | HDPE-I | EMC-I |
| Core material |  | HDPE-I | HDPE-I | HDPE-II | HDPE-I | HDPE-I | EMC-I | HDPE-I | HDPE-I | HDPE-I |
| Covering layer |  | EMC-I | EMC-II | EMC-I | HPPE-I | EVA-I | EMC-I | HDPE-I | HDPE-I | — |
| $MI_A/MI_B$ |  | 0.48 | 0.98 | 0.75 | — | — | — | — | — | 0.48 |
| Haze | % | 2.1 | 2.6 | 2.4 | 5.6 | 7.1 | 2.2 | 6.3 | 5.9 | 4.5 |
| Impact strength (0° C.) | kg-cm/cm | 1300 | 1350 | 1100 | 1200 | 1300 | 1900 | 1250 | 1260 | 1290 |
| Peeling strength of heat-sealed portion (g/15 mm) | 100° C. | 320 | 0 | 330 | 110 | 430 | 340 | 0 | 0 | 340 |
|  | 110° C. | 620 | 20 | 520 | 540 | 650 | 580 | 0 | 0 | 530 |
|  | 120° C. | 1020 | 350 | 1160 | 650 | 720 | 890 | 340 | 290 | 970 |
|  | 130° C. | 1370 | 1440 | 1530 | 630 | 790 | 960 | 690 | 680 | 1320 |
|  | 140° C. | 1410 | 1560 | 1620 | 690 | 830 | 1030 | 790 | 820 | 1400 |
|  | 150° C. | 1490 | 1590 | 1690 | 710 | 900 | 1150 | 1540 | 1580 | 1460 |
| Hot tackiness Peeling distance (mm) | 100° C. | Totally stripped | Totally stripped | Totally stripped | 120 | Totally stripped | Totally stripped | Totally stripped | Totally stripped | Totally stripped |
|  | 110° C. | 34 | Totally stripped | 40 | 68 | 260 | 45 | Totally stripped | Totally stripped | 65 |
|  | 120° C. | 9 | 98 | 6 | 63 | 71 | 8 | Totally stripped | Totally stripped | 13 |
|  | 130° C. | 8 | 10 | 5 | 65 | 41 | 7 | 135 | 131 | 8 |
|  | 140° C. | 7 | 9 | 6 | 53 | 30 | 6 | 98 | 92 | 9 |
|  | 150° C. | 6 | 7 | 6 | 59 | 31 | 4 | 70 | 63 | 11 |
| Flexural strength MD | kg/cm² | 72 | 73 | 76 | 72 | 70 | 26 | 80 | 78 | 75 |
| TD | kg/cm² | 76 | 78 | 83 | 75 | 75 | 31 | 85 | 86 | 79 |

TABLE 2

|  |  | Example 4 | Example 5 | Example 6 | Comparative Example 7 |
|---|---|---|---|---|---|
| Covering layer |  | EMC-III | EMC-III | EMC-III | EMC-III |
| Core material |  | HDPE-III | HDPE-III | HDPE-III | EMC-III |
| Covering layer |  | EMC-III | EMC-III | EMC-III | EMC-III |
| $MI_A/MI_B$ |  | 0.38 | 0.38 | 0.38 | — |
| Haze | % | 2.3 | 2.4 | 2.2 | 2.0 |
| Peeling strength of heat-sealed portion (g/15 mm) | 100° C. |  | 492 | 354 | 270 |
|  | 105° C. | 921 | 1113 | 996 | 753 |
|  | 110° C. | 1045 | 1310 | 1357 | 873 |
|  | 120° C. | 1244 | 1533 | 1600 | 1105 |
|  | 140° C. | 1329 | 1637 | 1672 | 1208 |
|  | 160° C. | 1346 | 1732 | 1730 | 1266 |
| Hot tackiness Peeling distance (mm) | 100° C. |  |  |  | Above 300 |
|  | 105° C. | Above 300 | Above 300 | Above 300 | Above 300 |
|  | 110° C. | 84 | 103 | 102 | 76 |
|  | 115° C. | 16 | 24 | 27 | 18 |
|  | 120° C. | 23 | 9 | 14 | 23 |
|  | 130° C. | 43 | 62 | 31 | 40 |

TABLE 2-continued

|  |  |  | Example 4 | Example 5 | Example 6 | Comparative Example 7 |
|---|---|---|---|---|---|---|
| Yield stress | MD | kg/cm$^2$ | 116 | 150 | 165 | 72 |
|  | TD | kg/cm$^2$ | 136 | 181 | 193 | 71 |
| Breaking stress | MD | kg/cm$^2$ | 488 | 561 | 585 | 409 |
|  | TD | kg/cm$^2$ | 336 | 332 | 341 | 306 |

We claim:

1. A composite film structure composed of a layer (A) of high density polyethylene having an intrinsic viscosity $[\eta]$ as measured in decalin at 135° C. of 1.3–2.9 dl/g, a melt index ($MI_A$) of 0.3–7.0 g/10 min. and a density of 0.950–0.970 g/cm$^3$, in which up to 2 mole % of an alpha-olefin may be contained; and layers (B) of an ethylene/C$_5$-C$_{10}$ alpha-olefin random copolymer having an intrinsic viscosity $[\eta]$ as measured in decalin at 135° C. of 1.0–2.4 dl/g, a melt index ($MI_B$) of 0.5–20 g/10 min., a density of 0.910–0.940 g/cm$^3$, and a melting point of 115°–130° C., with the proviso that the $MI_A/MI_B$ ratio is 0.15–4.0, said layers (B) being in direct contact with the two sides of said layer (A) and laminated thereto.

2. A composite film structure as defined in claim 1 wherein said $MI_A/MI_B$ ratio is 0.4–2.0.

3. A composite film structure as defined in claim 1 wherein said ethylene random copolymer is an ethylene/C$_6$-C$_8$ alpha-olefin copolymer.

4. A composite film structure as defined in claim 1 wherein said high density polyethylene is one having an intrinsic viscosity $[\eta]$ as measured in decalin at 135° C. of 1.6–2.4 dl/g, a melt index ($MI_A$) of 0.5–3.0 g/10 min., and a density of 0.950–0.965 g/cm$^3$.

5. A composite film structure as defined in claim 1 wherein said ethylene random copolymer is one having an intrinsic viscosity $[\eta]$ as measured in decalin at 135° C. of 1.2–2.0 dl/g, a melt index ($MI_B$) of 1.0–10 g/10 min., a density of 0.915–0.935 g/cm$^3$, and a melting point of 115°–125° C.

6. A composite film structure as defined in claim 1 wherein the thicknesses of said layers (A) and (B) are 5–100 microns and 1–20 microns, respectively.

7. A composite film structure as defined in claim 1 wherein the ethylene random copolymer has an ethylene content of from about 90 mole% to about 99.5 mole%.

* * * * *

UNITED STATES PATENT AND TRADEMARK OFFICE
CERTIFICATE OF CORRECTION

PATENT NO. : 4,380,567

DATED : April 19, 1983

INVENTOR(S) : Hiromi Shigemoto, Taketo Mimura, Tsuneo Kishiba, Susumu Hatabu.

It is certified that error appears in the above—identified patent and that said Letters Patent is hereby corrected as shown below:

On the title page,
After the first inventors name add the following:

Taketo Mimura, Ohtake, Japan;
Tsuneo Kishiba, Ohtake, Japan;
Susumu Hatabu, Iwakuni, Japan.

Signed and Sealed this

Twenty-first Day of June 1983

[SEAL]

Attest:

DONALD J. QUIGG

Attesting Officer

Acting Commissioner of Patents and Trademarks